(12) United States Patent
Bergez et al.

(10) Patent No.: US 12,448,259 B2
(45) Date of Patent: Oct. 21, 2025

(54) VERTICALLY STABILIZED PLATFORM

(71) Applicant: Industry Sherpa, Inc., Woodland Hills, CA (US)

(72) Inventors: Eric L Bergez, Woodland Hills, CA (US); Cordell Webb, Saugus, CA (US)

(73) Assignee: Industry Sherpa, Inc., Woodland Hills, CA (US)

( * ) Notice: Subject to any disclaimer, the term of this patent is extended or adjusted under 35 U.S.C. 154(b) by 327 days.

(21) Appl. No.: 18/150,714

(22) Filed: Jan. 5, 2023

(65) Prior Publication Data

US 2023/0211986 A1 Jul. 6, 2023

Related U.S. Application Data

(60) Provisional application No. 63/296,649, filed on Jan. 5, 2022.

(51) Int. Cl.
| | | |
|---|---|---|
| *B60N 2/50* | (2006.01) | |
| *B66F 3/22* | (2006.01) | |
| *B66F 7/06* | (2006.01) | |
| *B66F 7/28* | (2006.01) | |
| *B60N 2/54* | (2006.01) | |

(52) U.S. Cl.
CPC .......... *B66F 7/28* (2013.01); *B60N 2/50* (2013.01); *B66F 3/22* (2013.01); *B66F 7/06* (2013.01); *B66F 7/065* (2013.01); *B60N 2/54* (2013.01)

(58) Field of Classification Search
CPC ........ B60N 2/502; B60N 2/508; B60N 2/505; B60N 2/525; B60N 2/501; B60N 2/544; B60N 2/522; B66F 7/065; B66F 7/08

USPC ............... 248/588, 421, 564, 550; 187/269; 108/145; 254/122

See application file for complete search history.

(56) References Cited

U.S. PATENT DOCUMENTS

| | | | | |
|---|---|---|---|---|
| 4,577,821 A | * | 3/1986 | Edmo ..................... | B66F 7/065 |
| | | | | 187/269 |
| 4,712,653 A | * | 12/1987 | Franklin .................. | B66F 7/08 |
| | | | | 187/269 |
| 4,926,760 A | * | 5/1990 | Sack ........................ | B65G 1/07 |
| | | | | 248/588 |
| 5,632,209 A | * | 5/1997 | Sakakibara ........... | B66F 7/0608 |
| | | | | 248/588 |
| 5,833,198 A | * | 11/1998 | Graetz ..................... | A47B 9/16 |
| | | | | 248/370 |

(Continued)

*Primary Examiner* — Mahdi H Nejad
(74) *Attorney, Agent, or Firm* — Sean Lynch; Lynch LLP

(57) ABSTRACT

Embodiments of the inventive subject matter are directed to vertically stabilized platforms. These platforms have a top portion that moves only along a single axis (e.g., vertically up and down), and a bottom portion that remains stationary relative to a reference frame. The top portion is coupled with the bottom portion by scissor linkages that are all configured to slide on one end to allow the top portion to move up and down without any perturbations or movements along any other axes. Stabilization in some embodiments is accomplished by incorporating struts that couple with both the bottom portion (either directly or indirectly) and two of the scissor linkages. Struts can include both a damper and a spring and can be selected based on anticipated load to be stabilized. Embodiments can be mounted on, e.g., truck beds, ships, or other surfaces that can move, giving rise to a need for a stabilized platform.

8 Claims, 4 Drawing Sheets

(56) References Cited

U.S. PATENT DOCUMENTS

| | | | | |
|---|---|---|---|---|
| 5,927,679 A | * | 7/1999 | Hill | B60N 2/505 |
| | | | | 248/588 |
| 6,550,740 B1 | * | 4/2003 | Burer | B63B 39/005 |
| | | | | 248/370 |
| 7,383,923 B2 | * | 6/2008 | Patten | B66F 7/065 |
| | | | | 182/69.5 |
| 7,568,675 B2 | * | 8/2009 | Catton | B60N 2/508 |
| | | | | 296/65.02 |
| 8,179,078 B2 | | 5/2012 | Sidman | |
| 9,000,995 B2 | | 4/2015 | Blaney | |
| 9,752,717 B2 | | 9/2017 | Zaicevskij | |
| 2006/0278805 A1 | * | 12/2006 | Haller | B60N 2/525 |
| | | | | 267/136 |
| 2008/0190707 A1 | * | 8/2008 | Hoth | A61G 7/012 |
| | | | | 187/269 |
| 2011/0001342 A1 | * | 1/2011 | Deml | B60N 2/502 |
| | | | | 297/338 |
| 2011/0290978 A1 | * | 12/2011 | Keen | B60N 2/508 |
| | | | | 248/421 |
| 2011/0298266 A1 | * | 12/2011 | Haller | B60N 2/508 |
| | | | | 267/120 |
| 2015/0232005 A1 | * | 8/2015 | Haller | B60N 2/50 |
| | | | | 248/560 |

\* cited by examiner

VERTICALLY STABILIZED PLATFORM

This application claims priority to U.S. Provisional Patent Application No. 63/296,649, filed Jan. 5, 2022. All extrinsic materials identified in this application are incorporated by reference in their entirety.

FIELD OF THE INVENTION

The field of the invention is stabilized platforms.

BACKGROUND

The background description includes information that may be useful in understanding the present invention. It is not an admission that any of the information provided in this application is prior art or relevant to the presently claimed invention, or that any publication specifically or implicitly referenced is prior art.

In the field of mechanical stabilization and vertical shock dampening, many past efforts have been made to develop systems capable of creating a stabilized element such that instruments like cameras can be stabilized despite movements of a surface or object that the stabilization system is mounted to. In other contexts, stabilization can be useful to ensure weaponry is vertically stabilized when mounted to, e.g., a moving vehicle. But past efforts in this area have fallen short for a variety of reasons.

For example, U.S. Pat. No. 9,752,717 describes an industry standard for camera equipment that implements an underslung carriage for a camera that features gimbals and overhead stabilization. But this configuration has some natural limitations in terms of camera size and weight. Moreover, systems like these cannot bring a camera vertically up and down. Instead, the camera follows an arc according to the length of the arm that the system implements and that the camera is mounted to an end of. This patent describes some efforts to reconfigure such a system, though it falls short in that it remains constrained to an overly limited structural configuration.

U.S. Pat. No. 9,000,995 discloses a platform-style stabilizer that is used for satellite dishes. This patent discloses a 3-axis mount that keeps a satellite dish stable. But this patent focuses on the ability of the platform to make slow, precise movements such that the satellite dish can remain pointed at a satellite—it is not described as being capable of dynamic stabilization when used on, e.g., the back of a moving vehicle.

U.S. Pat. No. 8,179,078 describes an example of a camera stabilization system that can be mounted to a vehicle, but the system described in this patent features a series of nested frames that rotate about different axes, which results in a limited ability to accommodate larger cameras or, in other contexts, to accommodate something like a mounted firearm. These references all fail to contemplate advantages that come from having a stabilized platform that allows for surface mounted equipment.

In the context of film and TV, many existing systems are designed to feature a camera mount that hangs a camera from levered a stabilizing arm. Many of these mounts feature gimbals that, while the arm can create vertical damping, do not stabilize their payloads in a pure vertical motion, which results in a camera following an arc traveled by the stabilizing arm. Moreover, this sort of stabilizing system simply cannot be used effectively where space is limited (e.g., the bed of a truck, a cabin on a ship, etc.).

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that a passive and active stabilization platform can be created to stabilize in the z-axis (e.g., vertical, when on a level surface) a surface that can be used to mount different devices ranging from camera equipment, weaponry, and sensitive instruments.

SUMMARY OF THE INVENTION

The present invention provides apparatuses, systems, and methods directed to vertically stabilized platforms. In one aspect of the inventive subject matter, a stabilized platform includes: a top frame comprising a top guide rail; a bottom frame comprising a bottom guide rail; a top-sliding scissor linkage comprising a first pin joint at a bottom and a first sliding pin joint at a top end, where the first pin joint couples with the bottom frame and the first sliding pin joint slidably couples with the top guide rail; a bottom-sliding scissor linkage comprising a second pin joint at a top end and a sliding pin joint at a bottom end, where the second pin joint couples with the top frame and the second sliding pin joint slidably couples with the bottom guide rail; the top-sliding scissor linkage and the bottom-sliding scissor linkage are coupled by a third pin joint; a bottom strut cross member coupled with the bottom frame; a top strut cross member coupled with the top-sliding scissor linkage; and a strut (comprising, e.g., a spring and a damper) coupled with the bottom strut cross member at a first end and with the top strut cross member at a second end.

In some embodiments, the stabilized platform additionally includes a top surface coupled with the top frame. A stopper can also be included that couples with the bottom frame and configured to interact with the top frame upon compression of the top frame toward the bottom frame. In some embodiments, the first and second sliding pin joints comprise a plastic material to reduce friction between the first and second sliding pin joints and top and bottom guide rails, respectively.

In another aspect of the inventive subject matter, a stabilized platform includes: a top frame comprising a first top guide rail and a second top guide rail; a bottom frame comprising a first bottom guide rail and a second bottom guide rail; a first top-sliding scissor linkage comprising a first pin joint at a bottom end and a first sliding pin joint at a top end; a second top-sliding scissor linkage comprising a second pin joint at a bottom end and a second sliding pin joint at a top end, where the first pin joint and the second pin joint both couple with the bottom frame and the first sliding pin joint and the second sliding pin joint both slidably couple with the first top guide rail and the second top guide rail, respectively; a first bottom-sliding scissor linkage comprising a third pin joint at a top end and a third sliding pin joint at a bottom end; a second bottom-sliding scissor linkage comprising a fourth pin joint at a top end of the second bottom-sliding scissor linkage and a fourth sliding pin joint at a bottom end of the second bottom sliding scissor linkage, where the third pin joint and the fourth pin joint both couple with the top frame and the third sliding pin joint and the fourth sliding pin joint both slidably couple with the first bottom guide rail and the second bottom guide rail, respectively; the first top-sliding scissor linkage and the first bottom-sliding scissor linkage are coupled by a fifth pin joint, and the second top-sliding scissor linkage and the second bottom-sliding scissor linkage are coupled by a sixth pin joint; a bottom strut cross member coupled with the bottom frame; a top strut cross member coupled with the first and second top-sliding scissor linkages; and a strut coupled with the bottom strut cross member at a first end and with the top strut cross member at a second end.

In some embodiments, the first and second top guide rails are parallel and the first and second bottom guide rails are also parallel. The top frame can include a first approximately triangular section and a second approximately triangular section, where the third and fourth pin joints of the first and second bottom-sliding scissor linkages couple to the first approximately triangular section and the second approximately triangular section, respectively.

One should appreciate that the disclosed subject matter provides many advantageous technical effects including vertical stabilization without any movements along any other axes. Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
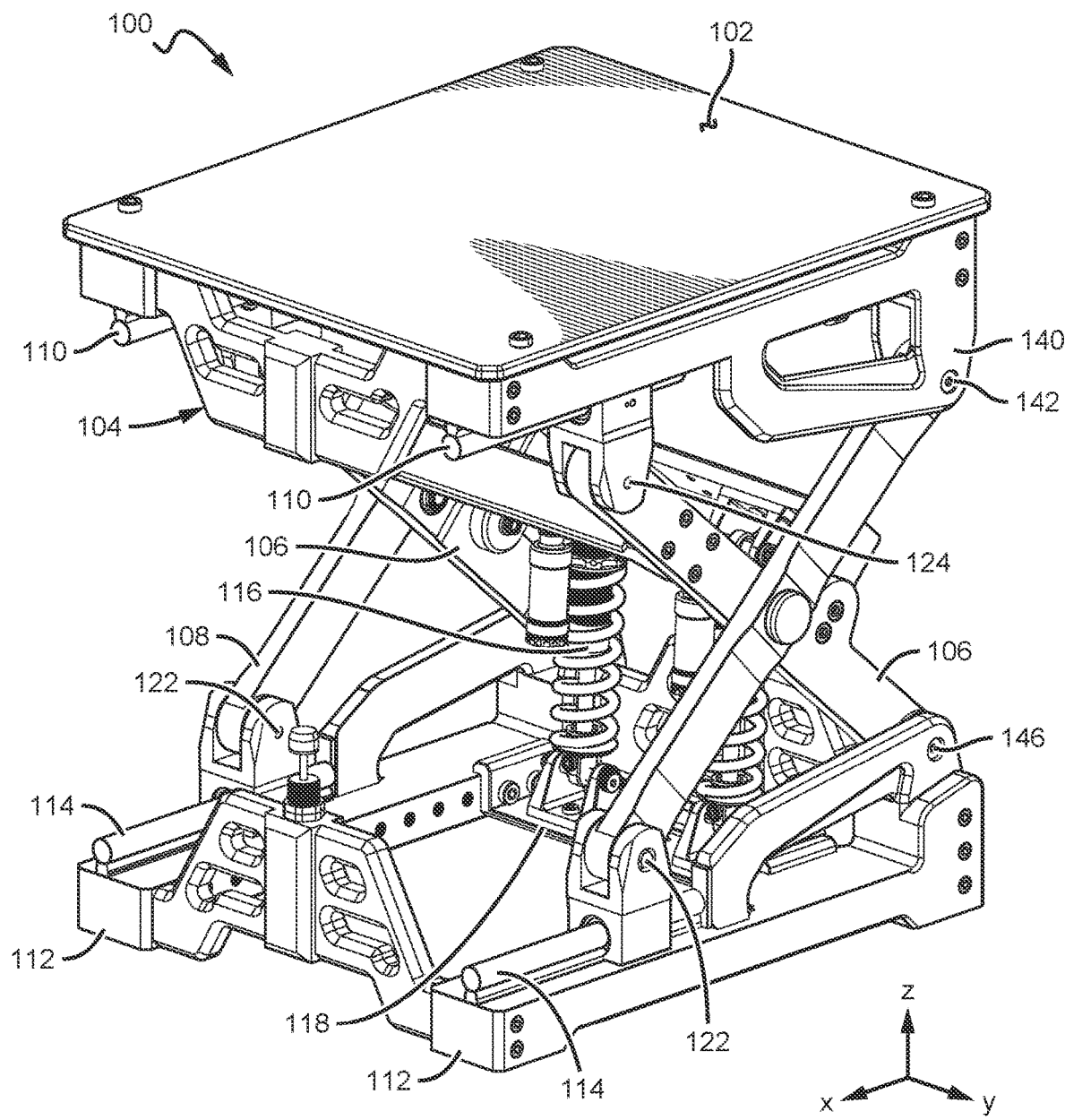
FIG. 1 is a front perspective view of a stabilization platform.

The following discussion provides example embodiments of the inventive subject matter. Although each embodiment can represent a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer or computing device should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Vertical stabilization platforms are used in many applications, from creating a stable platform for a camera (e.g., to film a scene in a movie or TV show or to take photographs) to creating a stable platform for, e.g., a weapon to be mounted on a moving vehicle and everything in between. Vessels at sea may also have a need for a stabilized platform that can, e.g., ensure sensitive equipment can operate properly or be spared from damage or malfunction in rough seas. As used in this application, the term "stabilized," "stabilization," and so on are intended to refer to both active stabilization (e.g., open- or closed-loop control systems) and passive stabilization (e.g., a spring/mass/damper system). Embodiments of the inventive subject matter are designed to give rise to a stabilized (e.g., actively leveled or passively damped) top portion of a platform that remains stable along a single axis while mounted or set on a surface or object (e.g., a vehicle, a ship, the ground, etc.).

Systems of the inventive subject matter are therefore designed to feature stabilization mechanisms that are disposed below, e.g., a platform surface. This confers advantages such as creating a top portion of the platform for equipment to be mounted or placed that is stabilized. That top portion can be, e.g., a flat, open space. Although shown as a flat surface on top in the figures, there is no requirement for the top surface to be flat, and it can instead be comprised of any kind of custom frame or mounting system that can couple with the stabilizing elements below the top surface. Systems where equipment to be stabilized must be mounted above or below a stabilizing arm—as often seen in the prior art—can be limited in size based on the configuration of the stabilizer. Moreover, lever arm-based systems cannot create stabilization along a single axis, resulting necessarily in the creation of a movement arc according to arm length of the stabilizing arm. High forces are also required to stabilize a mass at the end of a lever arm, and such systems can require complicated gimbal mechanisms that can accommodate only certain, smaller loads. Thus, platforms of the inventive subject matter are easier to use with a wider variety of payloads mounted or set on a top surface across a broader range of weights. By implementing hardware systems that facilitate primarily z-axis movements (e.g., vertical movements) without a need for a long lever arm, embodiments of the inventive subject matter can handle much heavier payloads.

Figure 2:
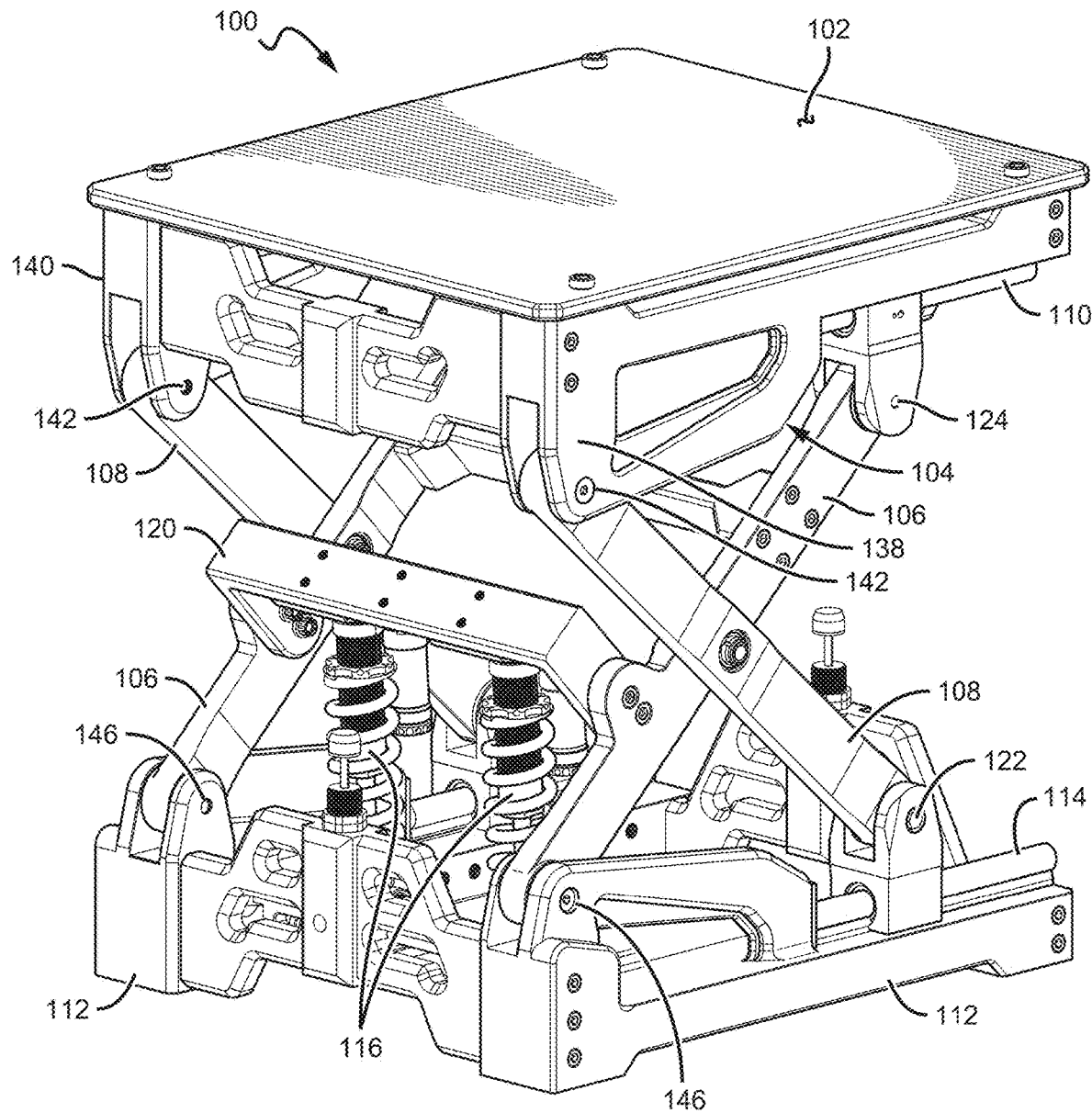
FIG. 2 is a rear perspective view thereof.

Embodiments of the inventive subject matter are designed to facilitate movement of a stabilized surface along a z-axis (as defined by the axes included next to FIG. 1). In some embodiments, the z-axis is normal to a stabilized top surface of a system of the inventive subject matter (i.e., where the top surface is parallel to the surface to which the platform is set or mounted), though it is not required for the stabilized top surface to be normal to the z-axis. FIGS. 1 and 2 show a stabilization platform 100 of the inventive subject matter from two different angles. Stabilization platform 100 is configured to dampen and stabilize a payload on its top surface 102 along the platform's z-axis. By focusing on z-axis stabilization, stabilization platform 100 is compact and minimizes use of mechanisms that can fail while also providing consistent and predictable movement along only a single axis.

Stabilization platform 100 comprises a top frame 104 that the top surface 102 couples to. Top frame 104 can be formed as a single piece or multiple pieces that are joined together either directly or indirectly (e.g., via the top surface 102). Top frame 104 thus couples with top-sliding scissor linkages 106 as well as bottom-sliding scissor linkages 108. Top-sliding scissor linkages 106 couple with top frame 104 via top sliding guides 110 and with bottom frame 112 via pin joints 146, while bottom-sliding scissor linkages 108 couple with bottom frame 112 via bottom sliding guides 114 and with the top frame 104 via pin joints 142 (shown in FIG. 4). Top-sliding scissor linkages 106 additionally couple with bottom-sliding scissor linkages 108 by pin joints in their middle portions to create an X-shaped configuration. This overall configuration results in high strength in both the x and y axes, despite allowing for movement only along the z-axis. This strength helps to prevent system failure when experiencing movements (e.g., changes in position and resulting derivative terms) in the x and y directions.

Stabilization is achieved at least in part by incorporating one or more struts 116. A "strut" as used in this application refers to a combination of a shock absorber with a spring element (e.g., as shown in the figures), such as a shock absorber with a coil over spring or the like. Struts that combine both a shock absorber and a spring element are preferable because they facilitate creation of a more compact spring/mass/damper system. In some embodiments the strut can refer to a set of components that are physically separate in, e.g., a side-by-side or other configuration such that the system can nevertheless still be modeled as a spring/mass/damper system. Each strut 116 combines a shock absorber and coil over spring. In some embodiments, struts 116 can be electronically actuated to bring about active stabilization. Thus, some embodiments of the inventive subject matter can include active damping to improve performance.

Passive damping can be described according to spring/mass/damper modeling for the system, while active damping can feature electronic, hydraulic, or other mechanical/electromechanical systems that are implemented (either alone or in combination with other systems) to improve damping based on factors such as vertical movements (e.g., position, velocity, acceleration, and further derivatives thereof along the system's z-axis). Active damping can thus require monitoring of signals generated by one or more inertial measurement units (IMU). An IMU is an electronic device that measures and reports a body's specific force, angular rate, and sometimes the orientation of the body, using a combination of accelerometers, gyroscopes, and sometimes magnetometers. In embodiments of the inventive subject matter, an IMU can be used to effect remote tuning of the system's dampers to actively adjust damping by measuring movements of the platform's stabilized surface. Vibration isolators and anti-vibration mountings be used to mount stabilization platform 100 to a surface to improve its performance. An IMU can be coupled with, e.g., top surface 102 or to a payload so that measurements from the IMU can be used to ensure top surface 102 remains stable. Gimbals, vibration isolators, and anti-vibration mountings can be implemented in association with top surface 102 to improve stabilization of the mounted device. In some embodiments, one or more IMUs can be implemented along with one or more computing devices to receive and process IMU information to create a control system (e.g., open- or closed-loop, depending on configuration).

FIG. 1 shows bottom strut cross member 118. Bottom strut cross member 118 couples with bottom frame 112 to give struts 116 a first structural member to couple with. FIG. 2 shows top strut cross member 120. Top strut cross member 120 couples with both bottom sliding scissor linkages 108, giving struts 116 a second structural member to couple with. Top strut cross member 120 thus moves with bottom-sliding scissor linkages 108 while bottom strut cross member 118 remains stationary as it couples with bottom frame 112. This configuration allows struts 116 to oppose movements of top surface 102, thereby creating a spring/mass/damper system that can be tuned according to actual or expected payloads. In some embodiments, bottom strut cross member 118 is formed as a part of bottom frame 112, and in some embodiments, top strut cross member 120 is formed as a part of top-sliding scissor linkages 106.

Top and bottom sliding guides 110 & 114 are designed to allow top surface 102 to move along a z-axis without perturbating in the x direction. Because of the way system 100 is configured, top surface 102 thus moves along the z-axis without any deviations, arcs, or sways that could impact the stability or function of a payload. By allowing one side of the top- and bottom-sliding scissor linkages to slide along top and bottom sliding guides 110 & 114, top surface 102 can smoothly move up and down while also remaining level. Bottom-sliding scissor linkages 108 couple with bottom sliding guides 114 by bottom sliding pin joints 122 that each couple with (or comprise) a slot that matches the cross-sectional shape of the bottom sliding guides 114. The same is true for the top-sliding scissor linkages 106, which couple to top sliding pin joints 124. In some embodiments, top and bottom sliding guides 110 and 114 can be lubricated to reduce friction between these components and the bottom- and top-sliding pin joints 122 and 124. In some embodiments, bearings can be implemented, or materials selected based on coefficients of friction (e.g., static and dynamic) between the sliding guides and the material of the sliding pin joints that contact the sliding guides. For example, the sliding pin joints can include a plastic material (e.g., nylon or the like) or coating that is configured to interact with the guide rails to minimize friction while also minimizing a number of moving parts. These features can be seen better in FIGS. 3 and 4.

Figure 3:
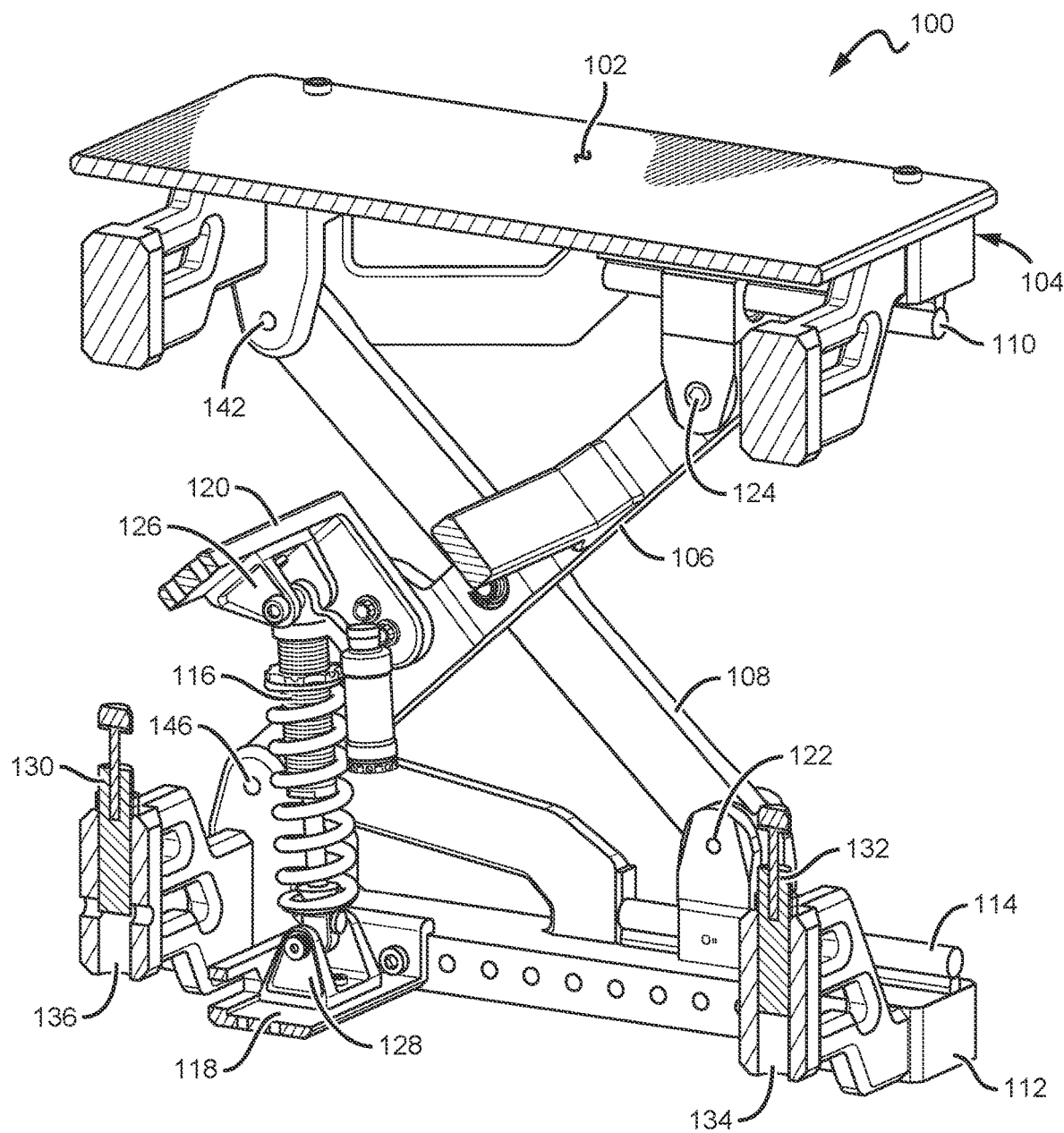
FIG. 3 is a cutaway view thereof.

FIG. 3 shows a cutaway view of stabilization system 100. In this view, one of the struts 116 is shown coupled with top static pin joint 126 and bottom static pin joint 128. The other strut not shown in this view is configured and coupled to the system similarly (and, in the case of stabilization system 100, symmetrically). Back stopper 130 and front stopper 132 are also visible both in this figure and in others. These mechanisms are included to prevent or otherwise minimize damage that can be caused when system 100 is fully compressed (e.g., when top surface 102 moves toward bottom frame 112. Damage is minimized or prevented because back stopper 130 and front stopper 132 interact with either top frame 104 (or, in some embodiments, top surface 102). Back stopper 130 and front stopper 132 are shown coupled with bottom frame 112. As shown in FIG. 3, back stopper 130 and front stopper 132 are shown inserted into holes 134 and 136 in bottom frame 112. In some embodiments back stopper 130 and front stopper 132 comprise male threading while holes 134 and 136 comprise female threading, while in other embodiments, the stoppers can be coupled with the holes by pressure fit, adhesive, or both.

Back and front stoppers 130 and 132 are additionally positioned on bottom frame 112 such that they will interact top frame 104 upon sufficient compression. The portions of the top frame 104 and the bottom frame 112 that back and front stoppers 130 and 132 are disposed on both protrude toward each other, as shown in the figures. These protrusions allow for the stoppers to prevent over compression while also providing a backstop via the frames themselves that prevent damage to components of the stabilization system. While a magnitude of compression described, e.g., as a point load or distributed load may be sufficient for certain embodiments to describe how far a stabilization system of the inventive subject matter can be compressed, it is more universally applicable to focus instead on a magnitude of vertical travel. An amount of vertical travel that a particular embodiment can undergo will depend upon that system's overall size as well as a distance between the system's top frame and stoppers. In some embodiments, stoppers comprise springs or spring equivalent mechanisms (e.g., air springs).

In one stabilization system, for example: the total height of the system when the top surface is fully upwardly extended is about 24.7"; and the fully compressed height of the system is about 13.4". This results in total top surface travel distance from full extended to fully compressed of about 11.4", while such a system weighs about 90 lbs. and fits into a footprint of 22.25" by 19" (where height varies as described). When loaded, the neutral height will rest somewhere between the fully extended height and the fully compressed height, depending on many factors including spring moduli, damper characteristics, payload weight, and so on. Systems of the inventive subject matter can be built to any needed size or specification.

Figure 4:
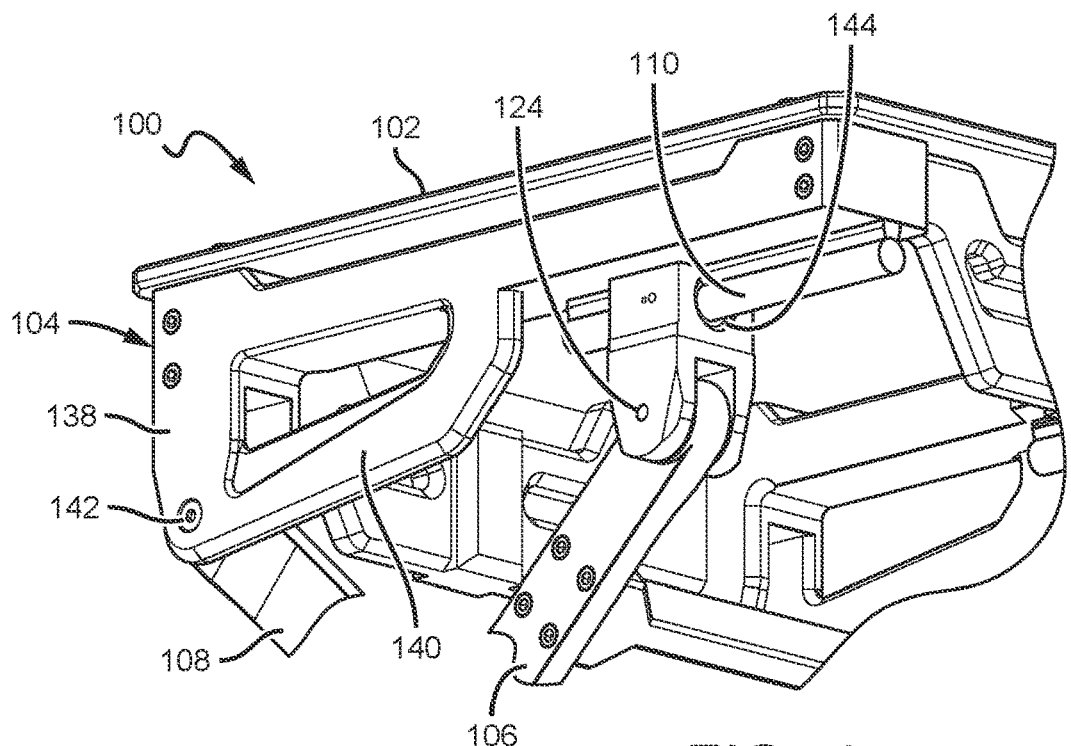
FIG. 4 shows a detail view of a top portion of the stabilization platform.
Figure 5:
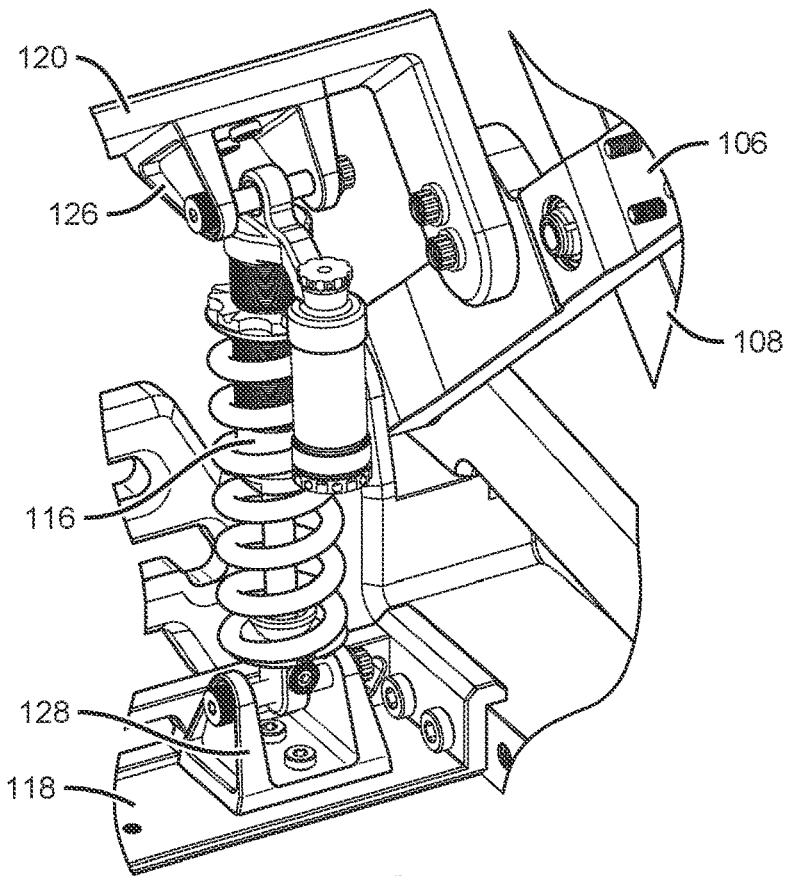
FIG. 5 shows a detail view of a strut portion of the stabilization platform.

FIG. 4 shows a close-up image of a top portion of stabilization system 100. This view makes it easier to see the configuration of top frame 104, which has a front end (drawn on the right on the figures sheet) and a back end (drawn on the left on the figures sheet). The back end comprises a downward protruding portion comprising structural members 138 and 140. Structural member 138 extends vertically downward and structural member 140 extends from structural member 138 back up to top frame 104. This forms an approximately triangular section of top frame 104. Roughly where structural members 138 and 140 meet, bottom-sliding scissor linkage 108 couples with top frame 104 via pin joint 142. Although not visible in this view, the bottom-sliding scissor linkage 108 on the opposite side couples with frame 104 in the same way (e.g., frame 104 is constructed symmetrically). This triangular section makes creates vertical displacement between a plane where the scissor linkages mate with top pin joints and a plane where the top surface is, which helps to ensure interior space exists within the system even at full compression, which can help to prevent damage to the system in scenarios where full (or over) compression occurs. The same triangular portions exist on the bottom frame for the same purpose.

FIG. 4 also makes more easily visible the slot portion 144 of a top sliding pin joint 124. As shown, slot portion 144 is configured to slide along top guide rail 110 to facilitate movement of top-sliding scissor linkage 106 that occurs when top surface 102/top frame 104 (and associated mechanisms or components) move vertically up and down.

Systems of the inventive subject matter are designed to facilitate assembly and repair or customization via part replacement. For example, struts 116 can easily be removed and replaced with struts having different mechanical characteristics, depending on a payload's characteristics (e.g., a payload's weight). In some embodiments, struts 116 can be manually adjusted to affect, e.g., damping or spring characteristics. By allowing for adjustments to be made to the mechanical characteristics of the system, a system supporting a payload can be tuned to stabilize vertical movement as efficiently and smoothly as desired. For example, in some embodiments, it may be desirable to implement a system that is critically damped given a certain payload, while in other embodiments, it may be desirable to implement a system that is overdamped (or even underdamped) to varying degrees for a certain payload.

In some embodiments, struts 116 can comprise linear actuators. Thus, a strut 116 can include a hydraulic, pneumatic, or electromechanical linear actuator and be configured to actuate such that strut 116 changes its length, thereby causing a change in configuration of stabilization platform 100 (e.g., top surface 102 moves up or down) by moving scissor linkages relative to each other and/or to top and bottom frames.

It is contemplated that embodiments of the inventive subject matter can be made according to a variety of different sizes to accommodate different payloads. Payloads that systems can accommodate range from 0 to 1,000s of pounds. In a preferred embodiment, a stabilization system can be tuned for a payload in the range of 50-300 lbs with a maximum payload weight of 300 lbs. These ranges and maxima can be adjusted by, e.g., using different struts or by adjusting the mechanical characteristics of existing struts as described above.

Stabilization system 100 is designed to reduce low frequency shock to payloads within the confines of the system's physical footprint (e.g., the system's outside dimensions). For example, an embodiment of the system can be designed to support a payload of 100 lbs. and reduce shock to the payload by almost 50% while softly rolling shock forces into more gradual movements. Thus, systems of the inventive subject matter provide stabilization against low frequency shock as well as shock reduction to protect sensitive payloads (e.g., camera or other optical equipment and the like). Systems of the inventive subject matter can be designed to support payloads above 100 pounds, though many payload weights can be accommodated by modifying the system as described above.

Shock can be measured in Pseudo Velocity Shock Spectrum (PVSS), Power Spectral Density (PSD), and Acceleration Time History at Peak Acceleration/Time. This data can be captured in real time using shock and vibration sensors (e.g., IMUs). IMUs can include, for example, piezoelectric MEMS, digital capacitive accelerometers, or the like. One suitable sensor is the Endaq Digital Capacitive sensor, which features a ±40 g at a 4 kHz sample rate. This and the following description are directed to how shock can be measured—measurement of shock is not required for systems of the inventive subject matter to function to reduce shock.

To collect movement data using multiple sensors, each sensor's internal can be synchronized at the beginning of each test cycle. A sensor can then be mounted to the top surface of a stabilization system while another sensor can be mounted to a base (e.g., a surface to which the stabilization system is affixed, such as the bed of a truck or the ground). Sensor data will be recorded and compared to display and analyze differences in the data from both the moving sensor and the non-moving, base-mounted sensor. Thus, shock absorbing characteristics of a particular system configuration with a particular payload can be measured for descriptive or optimization purposes.

Thus, specific systems and methods directed to vertical stabilization platforms have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A stabilized platform comprising:
   a top frame comprising a top guide rail;
   a bottom frame comprising a bottom guide rail;
   a top-sliding scissor linkage comprising a first pin joint at a bottom end of the top-sliding scissor linkage and a first sliding block at a top end of the top-sliding scissor linkage;
   wherein the top-sliding scissor linkage couples with the first sliding block by a first sliding block pin joint;
   wherein the first sliding block comprises a first elongated slot that is complementary to the top guide rail;
   wherein the first pin joint couples with the bottom frame and the first elongated slot slidably couples with the top guide rail;
   a bottom-sliding scissor linkage comprising a second pin joint at a top end of the bottom-sliding scissor linkage and a second sliding block at a bottom end of the bottom-sliding scissor linkage;
   wherein the bottom-sliding scissor linkage couples with the second sliding block by a second sliding block pin joint;
   wherein the second sliding block comprises a second elongated slot that is complementary to the bottom guide rail;
   wherein the second pin joint couples with the top frame and the second elongated slot slidably couples with the bottom guide rail;
   wherein the top-sliding scissor linkage and the bottom-sliding scissor linkage are coupled by a third pin joint;
   a bottom strut cross member coupled with the bottom frame;
   a top strut cross member coupled with the top-sliding scissor linkage; and
   a strut coupled with the bottom strut cross member at a first end and with the top strut cross member at a second end.

2. The stabilized platform of claim 1, further comprising a top surface coupled with the top frame.

3. The stabilized platform of claim 1, further comprising a stopper coupled with the bottom frame and configured to interact with the top frame upon compression of the top frame toward the bottom frame.

4. The stabilized platform of claim 1, wherein the strut comprises a spring and a damper.

5. The stabilized platform of claim 1, wherein the first and second elongated slots comprise a plastic material to reduce friction between the first and second elongated slots and top and bottom guide rails, respectively.

6. A stabilized platform comprising:
   a top frame comprising a first top guide rail and a second top guide rail;
   a bottom frame comprising a first bottom guide rail and a second bottom guide rail;
   a first top-sliding scissor linkage comprising a first pin joint at a bottom end of the first top-sliding scissor linkage and a first sliding block at a top end of the first top-sliding scissor linkage;
   wherein the first top-sliding scissor linkage couples with the first sliding block by a first sliding block pin joint;
   wherein the first sliding block comprises a first elongated slot that is complementary to the first top guide rail;
   a second top-sliding scissor linkage comprising a second pin joint at a bottom end of the second top-sliding scissor linkage and a second sliding block at a top end of the second top-sliding scissor linkage;
   wherein the second top-sliding scissor linkage couples with the second sliding block by a second sliding block pin joint;
   wherein the second sliding block comprises a second elongated slot that is complementary to the second top guide rail;
   wherein the first pin joint and the second pin joint both couple with the bottom frame and the first elongated slot and the second elongated slot slidably couple with the first top guide rail and the second top guide rail, respectively;
   a first bottom-sliding scissor linkage comprising a third pin joint at a top end of the first bottom-sliding scissor linkage and a third sliding block at a bottom end of the first bottom-sliding scissor linkage;
   wherein the first bottom-sliding scissor linkage couples with the third sliding block by a third sliding block pin joint;
   wherein the third sliding block comprises a third elongated slot that is complementary to the first bottom guide rail;
   a second bottom-sliding scissor linkage comprising a fourth pin joint at a top end of the second bottom-sliding scissor linkage and a fourth sliding block at a bottom end of the second bottom-sliding scissor linkage;
   wherein the second bottom-sliding scissor linkage couples with the fourth sliding block by a fourth sliding block pin joint;
   wherein the fourth sliding block comprises a fourth elongated slot that is complementary to the second bottom guide rail;
   wherein the third pin joint and the fourth pin joint both couple with the top frame and the third elongated slot and the fourth elongated slot slidably couple with the first bottom guide rail and the second bottom guide rail, respectively;

wherein the first top-sliding scissor linkage and the first bottom-sliding scissor linkage are coupled by a fifth pin joint, and wherein the second top-sliding scissor linkage and the second bottom-sliding scissor linkage are coupled by a sixth pin joint;

a bottom strut cross member coupled with the bottom frame;

a top strut cross member coupled with the first and second top-sliding scissor linkages; and a strut coupled with the bottom strut cross member at a first end and with the top strut cross member at a second end.

7. The stabilized platform of claim 6, wherein the first and second top guide rails are parallel and wherein the first and second bottom guide rails are parallel.

8. The stabilized platform of claim 6, wherein the top frame comprises a first approximately triangular section and a second approximately triangular section, wherein the third and fourth pin joints of the first and second bottom-sliding scissor linkages couple to the first approximately triangular section and the second approximately triangular section, respectively.

* * * * *